(12) United States Patent
Holst

(10) Patent No.: US 11,222,503 B2
(45) Date of Patent: Jan. 11, 2022

(54) VERIFIABLE TRANSFER OF DATA OVER A NETWORK

(71) Applicant: ALM. DANSK VARE-OG INDUSTRILOTTERI, Copenhagen (DK)

(72) Inventor: Anders Kristoffer Holst, Charlottenlund (DK)

(73) Assignee: ALM. DANSK VARE—OG INDUSTRILOTTERI, Copenhagen (DK)

( * ) Notice: Subject to any disclaimer, the term of this patent is extended or adjusted under 35 U.S.C. 154(b) by 844 days.

(21) Appl. No.: 15/560,666

(22) PCT Filed: Mar. 15, 2016

(86) PCT No.: PCT/EP2016/055537
§ 371 (c)(1),
(2) Date: Sep. 22, 2017

(87) PCT Pub. No.: WO2016/150760
PCT Pub. Date: Sep. 29, 2016

(65) Prior Publication Data
US 2018/0108210 A1  Apr. 19, 2018

(30) Foreign Application Priority Data

Mar. 25, 2015 (EP) ..................... 15160904

(51) Int. Cl.
*G07F 17/32* (2006.01)
*G06F 16/25* (2019.01)
(Continued)

(52) U.S. Cl.
CPC .......... *G07F 17/3225* (2013.01); *G06F 16/25* (2019.01); *G06F 21/6227* (2013.01);
(Continued)

(58) Field of Classification Search
CPC ............. G07F 17/3225; G07F 17/3241; G07F 17/329; G06F 16/25; G06F 21/6227; G06F 2221/2107; H04L 29/06707; H04L 63/12
See application file for complete search history.

(56) References Cited

U.S. PATENT DOCUMENTS 5,892,900 A * 4/1999 Ginter ..................... G06F 21/10
726/26
6,273,817 B1    8/2001 Sultan
(Continued)

FOREIGN PATENT DOCUMENTS

CN   103295311 A *  9/2013
EP   0956117      5/2007
(Continued)

OTHER PUBLICATIONS

International Search Report on corresponding PCT application (PCT/EP2016/055537) from International Searching Authority (EPO) dated May 3, 2016.
(Continued)

*Primary Examiner* — John W Hayes
*Assistant Examiner* — Taylor S Rak
(74) *Attorney, Agent, or Firm* — Klein, O'Neill & Singh, LLP

(57) ABSTRACT

A method of conducting a verifiable transfer of data over a network comprising generating a batch of data sets (18) at a secure database (14), each of the data sets comprising an identifier (22) and an indexed array of digital symbols, and transferring an encrypted version (30) from the secure database to a public database (28). The method, which may be performed in an environment like an on-line lottery, further comprises selecting one of the data sets of the batch and removing the selected data set from the batch and transferring the digital symbol associated with a user-se-
(Continued)

lected index of the indexed array of digital symbols of the selected data set from the secure database to the user-operated device. Finally, the method comprises transferring a decryption key from the secure database to the public database and reproducing the batch of data sets at the public database. This method ensures that a user of a remote device (26) can verify the integrity of the generated data set (18), which was not integrally downloaded initially.

14 Claims, 4 Drawing Sheets

(51) Int. Cl.
  *H04L 29/06* (2006.01)
  *G06F 21/62* (2013.01)
(52) U.S. Cl.
  CPC ........ *G07F 17/329* (2013.01); *G07F 17/3241* (2013.01); *H04L 29/06707* (2013.01); *H04L 63/12* (2013.01); *G06F 2221/2107* (2013.01)

(56) References Cited

U.S. PATENT DOCUMENTS

| | | | |
|---|---|---|---|
| 6,572,471 | B1 | 6/2003 | Bennett |
| 7,892,087 | B1 | 2/2011 | Hamman et al. |
| 7,980,937 | B2 | 7/2011 | Bennett, III |
| 8,016,662 | B1 | 9/2011 | Hamman et al. |
| 8,109,828 | B2 | 2/2012 | Kane et al. |
| 8,133,104 | B2 | 3/2012 | Black et al. |
| 8,393,949 | B2 | 3/2013 | Kane et al. |
| 8,398,484 | B2 | 3/2013 | Wright et al. |
| 8,641,522 | B2 | 2/2014 | Tarantino |
| 8,751,804 | B1 | 6/2014 | Nystrom et al. |
| 2004/0254019 | A1 | 12/2004 | Riendeau et al. |
| 2005/0098951 | A1 | 5/2005 | Groves |
| 2007/0082722 | A1 | 4/2007 | Groves |
| 2012/0214571 | A1* | 8/2012 | Oakes .................... G07F 17/32 463/17 |
| 2012/0323708 | A1 | 12/2012 | Marinakis et al. |
| 2014/0045568 | A1* | 2/2014 | Bennett, III .......... G07F 17/323 463/17 |
| 2014/0315614 | A1 | 10/2014 | Granich et al. |

FOREIGN PATENT DOCUMENTS

| | | |
|---|---|---|
| EP | 1556840 | 7/2007 |
| EP | 1355705 | 7/2010 |
| EP | 0999883 | 8/2010 |
| EP | 2346005 | 7/2011 |
| WO | WO2003042897 | 5/2003 |
| WO | WO2003091923 | 11/2003 |
| WO | WO2009038629 | 3/2009 |
| WO | WO2009156874 | 12/2009 |
| WO | WO-2010043256 A1 * | 4/2010 ......... G07F 17/3241 |

OTHER PUBLICATIONS

Written Opinion on corresponding PCT application (PCT/ EP2016/ 055537) from International Searching Authority (EPO) dated May 3, 2016.

* cited by examiner

ID number, which is used for the purposes of
VERIFIABLE TRANSFER OF DATA OVER A NETWORK

CROSS-REFERENCE TO RELATED APPLICATIONS

This application is the national phase entry, under 35 U.S.C. Section 371(c), of International Application No. PCT/EP2016/055537, filed Mar. 15, 2016, claiming priority from European Application No. 15160904.7, filed Mar. 25, 2015. The disclosures of the International Application and the European Application from which this application claims priority are incorporated herein by reference in their entireties.

FEDERALLY SPONSORED RESEARCH OR DEVELOPMENT

Not Applicable

The present invention relates to methods and systems for conducting a verifiable transfer of data over a network. The present methods and systems may be used in all occasions where a user-operated device is communicating with a secure database and the user is temporarily prevented from accessing some relevant information at the time of communicating with the secure database and thus the user may wish to ac-quire or check the non-accessed information at a later time. The methods and systems are preferably used when conducting online lotteries with user participation, e.g scratch tickets. The lottery has the particular feature that a) all issued lottery tickets are possible winning tickets, and b) that there still exist a possibility to win until the last allowed field of the scratch ticket has been scratched by the user. The methods and systems may in principle be used for other purposes as well, such as online banking, shopping, or similar online transactions which may require a review at a later time WHEN the communication with the secure database has been concluded.

BACKGROUND OF THE INVENTION

Online lotteries are mostly derived from previous lotteries in which physical lottery tickets are used. Online lotteries have the advantage, apart from the increased accessibility by the user (i.e. there is no need to visit a lottery kiosk or the like), that it is possible to implement additional safety features in the lottery. These added safety features will allow a greater user involvement in the lottery, which will add to the total lottery excitement and experience of the user.

Standard scratch off lottery tickets, both virtual online tickets and physical tickets, typically include a number of obscured fields which are to be scratched by the user to reveal digital symbols which may be combined to result in either a win or a loss. Whereas the digital symbols of physical scratch off lottery tickets are obscured by a polymeric layer which may be removed to reveal the digital symbols, the online tickets use computer visualization methods to obscure and reveal the digital symbols. Typically, in case a user reveals three identical digital symbols, the user will win a prize, such as an amount of money, otherwise the user has lost the money paid for the ticket. In most lotteries, however, the scratching of the fields is a mere gimmick, intended to create excitement and entertainment for the user, since each lottery ticket normally has a unique identifier, such as an ID number, which is used for the purposes of determining a winning lottery ticket at the lottery organizer. The use of ID numbers instead of the actual scratchable fields by the organizer eliminates the possibility of committing fraud by manipulating the scratchable fields of the ticket and makes it easier for the lottery organizer to post the results of the lottery.

Thus, in the above mentioned scratch off lotteries, the winning and losing tickets are predetermined. Thus, in an online lottery, the complete lottery ticket including the digital symbols of all scratchable fields may be sent to the user, since the lottery organizer may immediately, even without the lottery ticket being scratched, determine whether or not the ticket is a winning or loosing ticket simply by checking the ID number of the lottery ticket. The present invention, on the contrary, relates to a different type of online scratch lottery in which all lottery tickets have a chance of being a winning ticket, depending on user choices. Thus, not all of the fields are to be scratched and depending on which fields the user scratches, the outcome may be a win or a loss. In such a lottery the organizer cannot determine outcome simply by using the ID number alone since the user input is decisive on the outcome. For this reason, the complete lottery ticket including the unscratched digital symbols cannot be transferred to the user since it would allow a fraudulent user the possibility to gain access to the digital symbols beneath unscratched fields of the online lottery ticket before scratching any of the fields and thus the fraudulent user would scratch only the fields yielding the highest prize every time.

For avoiding such fraudulent behaviour it is intended to transfer to the user, apart from a lottery ticket ID number and the number of available fields, only the digital symbols of the fields which the user has indicated to be scratched. Thus, the user may never see the complete lottery ticket, or may only see the complete lottery ticket after the last allowable field is scratched. This allows the lottery organizer to be substantially safe from fraudulent behaviour from the user, however, other fraudulent behaviour will still be possible. In particular, such fraudulent behaviour may be that the secure database of the lottery organizer is hacked or otherwise manipulated such that the user will always loose, or a third party may intercept and modify the communication between the secure database and the user, a so-called "man in the middle attack". It is thus an object of the present invention to provide technologies for allowing the user to feel safe and be confident that the lottery is conducted properly. Further, there may exist laws and regulations which require the lottery organizer to ensure that no fraudulent behaviour has taken place and the present invention further provides the advantage of satisfying such needs.

A large amount of prior art exists in the present technical field. EP 722 353 B1 relates to a win checking system for use with a computerized wagering system. The user may use the system to check whether a winning configuration is found or not on the user's lottery ticket.

EP 956 117 B1 relates to a lottery system whereby instant tickets with a predetermined outcome can be rendered on a gaming computer. The gaming computer does not require an on-line connection to the central computer after purchase of the ticket in order to view the outcome.

EP 999 883 B1 relates to a computerized lottery in which an animation is generated to present the lottery winner.

EP 1 355 705 B1 relates to a system for purchasing lottery tickets over the Internet. A server hosts at least one virtual group of lottery ticket purchasers. The server then communicates the results of the purchases of lottery tickets to the purchasers on the basis of the group information.

EP 1 556 840 B1 relates to a telelotto system including a maze labyrinth arranged for the distribution of the prize draws.

EP 2 346 005 A2 relates to a method of conducting a lottery wherein the lottery participant fills in data fields of the lottery ticket with values received during a preliminary lottery that he/she participated in, participation in the preliminary lottery enabling the lottery participants to increase or decrease the face value of the lottery ticket.

WO 03/042897 A1 relates to a method of administering a lottery including the steps of deducting a cost of the chosen play from the balance of said user account, and if it is verified that the chosen play is a winner, crediting a winning monetary amount for the chosen play to the user account.

WO 03/091923 A1 relates to a marketing lottery card in a form of a mosaic puzzle, wherein the winning or losing status of the marketing lottery card is verified by overlapping the marketing lottery card on a bingo confirmation table provided on-line or offline.

U.S. Pat. No. 8,109,828 B2 relates to a system for playing a game of chance. A partial result of the game of chance is revealed to a player in an offline portion of the game. The remaining portion of the result is revealed to the player in an online portion of the game. The games may be e.g. a slot machine game, a bingo game, a roulette game.

U.S. Pat. No. 8,393,949 B2 relates to a computer implemented method for conducting a game of chance. The game includes a ticket-based game and a computer-based game. The ticket includes a code to reveal the result of the ticket based game and access the computer-based game.

U.S. Pat. No. 8,398,484 B2 relates to an instant online lottery game. The system comprises a server, which can have a first random number generator that can generate the instant online lottery number and a second random number generator that generates a plurality of game-play combinations. The instant online lottery number and the plurality of game-play combinations can be provided to the player at the time of purchase of the instant online lottery ticket.

US 2004/0254019 A1 relates to an online game of chance. The game is based on a map having multiple branches, where a desired path is selected by clicking on the branch. Each available branch that is selected results in a prize value being increased, decreased, or a token being awarded for later use in the game.

US 2005/0098951 A1 relates to a card game method. The method comprises shuffling the deck, placing at least one wager, dealing each of the playing cards in an arrangement and revealing a face of each of the playing cards, totaling a number of points associated with the dealt playing cards and paying any winning wager according to the bet and odds associated with the winning wager.

US 2012/0323708 A1 relates to a user interface for purchasing and redeeming lottery tickets, wherein the lottery facility has only write-only access to a winning lottery numbers database, wherein the lottery vending service has only read-only access to the winning lottery numbers database, wherein the lottery vending service providers have only write-only access to a purchased lottery numbers database, wherein the lottery facility has only read-only access to the purchased lottery numbers database.

US 2014/0315614 A1 relates to an online lottery scratcher system. The user has a wireless touch screen device for interactively interfacing with the at least one digital programmable online lottery scratcher application to display a digital scratch-off ticket.

WO 2009/038629 A2 relates to a device for registering a domain name, comprising a scratch card including an identifier concealed by an opaque substance, the identifier being adapted for a system for registering domain names, the opaque substance being adapted for at least partial removal from the card in order to expose the identifier to a user.

U.S. Pat. No. 6,572,471 B1 relates to a slot machine having a video display screen controlled to display a game image divided into a matrix of elements or player selectable zones.

The video screen is preferably of the touch sensitive variety. The player may select one of the matrix elements, thereby causing the image in the element to change to reveal whether or not a prize value is associated with that zone.

U.S. Pat. No. 8,133,104 B2 relates to an online poker gaming system comprising a live or recorded poker game. The player terminal displays images of the live or recorded game being broadcast for view by an online player. The player terminal also includes a key-pad, enabling the online player to select one or more players to win, and select a value for each selection. So while the online player cannot make gaming decisions, the online player can participate by making selections, much as one would make selections at a racetrack. The online player can make multiple playing selections unavailable to the player sitting at the table.

U.S. Pat. No. 8,641,522 B2 relates to a gaming system in which players are assigned individual gaming devices comprising electronic game boards. The gateway confirms the identity of each player so that a player may only access their assigned and dedicated gaming device.

U.S. Pat. No. 8,016,662 B1 relates to a gaming system in which one or more parameters for a game are defined and the parameters are communicated in a parameter file to a trusted third party.

US 2007/0082722 A1 relates to a card game. The game comprises betting, dealing at least thirteen playing cards, placing a hold on any cards, replacing each non-held card with one playing card dealt face up, comparing the thirteen cards to the predetermined winning combinations to determine if a winning card combination exists.

US 2014/0045568 A1 relates to a system for lottery ticket verification. A first server system stores a validation file having validation records for lottery tickets. A second server system stores a verification file having verification records for the lottery tickets provided to the players and is made accessible to players prior to redemption of the lottery ticket, wherein a player enters a code provided on the lottery ticket that is linked to the specific verification record for the lottery ticket and is provided with the winning or losing status of the lottery ticket.

U.S. Pat. No. 6,273,817 B1 relates to a tamper resistant lottery ticket for preventing payoff of invalid tickets comprising: a ticket body, a plurality of game fields which can be chosen by a lottery player, at least one winning digital symbol for the ticket positioned in a game field, a scratch-off material covering the game fields to hide the contents of the game fields, a readable security code printed in each of the game fields. The security codes of the ticket may be read to ensure that the proper number of game fields is revealed and the lottery ticket is valid.

U.S. Pat. No. 7,980,937 B2 relates to an instant lottery ticket system having a ticket validation file. Security of the validation file is provided by an audit system. Audit data, based on ticket data that is used to print the instant lottery tickets, can be compared to the information in the validation file to confirm the integrity of the validation file. The audit data can include all or a portion of the records that should be in the validation file or selected portions of data in the records such as ticket redemption values.

WO 2009/156874 A1 relates to a validity control method in a lottery based on the principle that a player scratches covered fields on a ticket to uncover hidden information like letters, numbers figures etc. The ticket comprises a number of scratchable fields, more than the number of fields to actually be scratched. When a player, when scratching the ticket, detects an ultimate loss, the remaining scratchable fields may also be scratched to thereby check its original winning possibilities.

SUMMARY OF THE INVENTION

At least the above object or at least one of numerous further objects which will be evident from the below description of the present invention, is according to a first aspect of the present invention obtained by a method of conducting a verifiable transfer of data over a network, the method comprising the steps of:

a1) providing a secure database, a public database, and one or more user-operated devices, all being connected to the network, a2) generating a batch of data sets at the secure database, each of the data sets comprising an identifier uniquely identifying the data set within the batch and an indexed array of digital symbols whereby each digital symbol is chosen from a group of digital symbols, a3) generating an encrypted version of the batch and a decryption key at the secure database, b) transferring the encrypted version from the secure database to the public database, generating a receipt at the public database and transferring the receipt from the public database to the secure database, c) selecting one of the data sets of the batch and removing the selected data set from the batch, the selecting of one of the data sets is made by the user-operated device or alternatively randomly by the secure database, d) transferring the identifier of the selected data set and a value corresponding to the total number of digital symbols in the indexed array of digital symbols of the selected data set from the secure database to a user-operated device, e) transferring a user-selected index associated with the indexed array of digital symbols of the selected data set from the user-operated device to the secure database and transferring the digital symbol associated with the user-selected index of the indexed array of digital symbols of the selected data set from the secure database to the user-operated device, f) repeating step e) a predetermined number of times, whereby the total number of digital symbols transferred from the secure database to the user-operated device being less than the value corresponding to the total number of digital symbols in the indexed array of digital symbols of the selected data set, g) repeating steps c)-f) until all data sets of the batch have been removed, and h) transferring the decryption key from the secure database to the public database, reproducing the batch of data sets at the public database by using the encrypted version and the decryption key, and allowing the user-operated device to access the selected data set at the public database by using the identifier.

The network over which data communication is performed is typically a wide area network which may at some point be vulnerable to outside attacks from fraudulent persons. Although, as stated in the introduction, the present method may be used in various circumstances where a verifiable data transfer is required, it is typically used for the purpose of conducting an online lottery game or similar gaming or gambling activities such as online bingo, online poker or other similar games of chance.

The secure database is understood to comprise a computer or server having a processing unit, a memory and capabilities of communicating securely over the network, preferably via a separate server, firewall or similar in order to restrict the possibilities of an intrusion by any fraudulent person. The public database may be of similar hardware construction as the secure database, however, should be accessible to the public, or at least the users. Preferably, the public database is supervised by a public notary. The users are able to access both the secure database and the public database via the network by using electronic hardware which may be well known per se. It is thereby understood that the access may be established via web servers or similar in order to prevent fraudulent attacks on the secure and public databases. The user-operated device typically includes a screen for visualizing the data and an input device for selecting data to be visualized. It is understood that both the secure database and the public database may be located on one or more servers operated by a third party.

The batch of data sets typically corresponds to a number of lottery tickets, at least more than zero lottery tickets, wherein each data set corresponds to a "virtual" lottery ticket, and hereinafter the expression "data set" will be used for representing a lottery ticket. The identifier is typically an ID number which makes each data set identifiable within the batch. The indexed array of digital symbols corresponds to the scratchable fields of a scratch-off lottery ticket, whereby the digital symbols are hidden from the user until the user intends to unveil the data field. The indexed array of digital symbols will be visualized on the screen of the user-operated device as e.g. a matrix, and at least a part of the digital symbols will be unveiled and visualized to the user upon request by the user as the lottery game proceeds. The digital symbols are chosen from a group of digital symbols and each digital symbol may, according to the rules of the game, have a predetermined "value" for later determining the prize money which may be won by the user. It is further understood that the system may constitute a blank or empty digital symbol, which nevertheless must be transmitted to the user in pretty much the same way as a digital symbol having a "value".

Before the batch is activated, i.e., before the users are able to purchase and/or receive data sets from the batch, the batch is encrypted in its entirety and transmitted to the public database without thereby transferring the decryption key. The data sets of the batch will thus not be published at this instance, merely the information that the batch has been uploaded to the public database. After the secure database has received a receipt acknowledging the successful uploaded, the batch may be activated, i.e. the users may be able to purchase and/or receive data sets from the batch.

When the user has purchased a data set (or alternatively received a free data set as part of a commercial event, as a previous winning in another lottery or as a gift certificate etc.), which purchase may be made and recorded using a standard online shopping web application, the user will receive a data set of the batch. The data set will then be removed from the batch, either by being physically separated or alternatively marked as being used, for preventing that the same data set could be sold to a different user. To prevent the user from attempting to unveil digital symbols of the indexed array of digital symbols without informing the secure database and thereby be able to fraud the lottery, only a part of the data set is transferred to the user-operated device. Initially, only the identifier and the total number of digital symbols in the indexed array of digital symbols are transferred to the user. In this way, the user may identify its lottery ticket and will be able to know the total number of fields which may be scratched. The user will also be informed how many digital symbols to unveil according to the rules of the game.

The data set may be selected by the user by e.g. choosing an identifier in a list of available identifiers. Alternatively, the data set is selected randomly among the data sets remaining in the batch by the secure database e.g. by using a standard random number generator. Yet alternatively, a combination of the above may be contemplated where the random number generator and user selection is combined.

In the next step, the user sequentially unveils a predetermined number of fields of the online scratch-off lottery ticket visible on the screen on the user-operated device, and in this context, an index corresponding to the field indicated by the user is sent to the secure database and the secure database immediately responds by sending the digital symbol associated with the index back to the user for the user-operated device to display on its screen. When the user has revealed the predetermined number of fields, as prescribed by the rules of the game and which always is a lower number than the total number of fields, the game ends and depending on the digital symbols unveiled by the user, a win or loss may be determined and the prize, e.g. a monetary amount or goods, won by the user is immediately apparent to the user by consulting an appending table of prizes or the like.

After the complete batch of data sets have been removed from the batch and the pre-determined number of fields have been unveiled by the users, i.e. all lottery tickets have been sold and used by the users, or the complete batch may be automatically removed after a predetermined period of time, e.g. 24 hours, have passed since the batch was created, the batch is considered to be finished. In order for the users and optionally for a lottery inspection authority to confirm that no fraud has taken place, the secure database will then transmit the decryption key to the public database such that the public database may restore the complete batch of data sets. The user has stored the identifier of the data set and the fields chosen by the user. In this way, the user and optionally the lottery inspection authority may check whether the lottery was conducted properly or not via the public database.

According to a further embodiment of the first aspect, the method comprises a further step a4) providing a main server for controlling the secure database and/or a web database constituting the interface between the user-operated device and the secure database.

In order to allow the secure database to be run smoothly, some tasks inevitably associated with the hosting of an online lottery may be run on one or more different servers. For instance, a web server may be used for interfacing with the user-operated devices, and a main server may be used for allowing the lottery organizer to set up the number of batches of data sets, the properties of the data sets, the group of digital symbols, the predetermined number of fields to be unveiled by the user, the prizes to be won by the users, the payment of the lottery tickets and so on.

According to a further embodiment of the first aspect, the network is the Internet.

Preferably, the network communication is performed over the Internet which is by far the most widely used international communication network.

According to a further embodiment of the first aspect, the method in step e), further comprises transferring the identifier and the user-selected index associated with the indexed array of digital symbols of the selected data set from the user-operated device to the public database.

In order for the user to obtain an undisputable evidence of the user-selected fields to be unveiled, the user-selected index may be uploaded to the public database. The user-uploaded index may then be immediately compared with the index received by the secure database and in case of a match, the secure database may send the digital symbol to the user. This allows a fully automatic check at the public database by matching the data set and the selected indexes assigned to the user's identifier. It is understood that a certain time period may pass before the user may verify the data set at the public server, such as 24 hours.

According to a further embodiment of the first aspect, the public database is independent and physically separated from any of the users and the secure database. The public database should be separated from the secure database and be supervised and maintained by a third party which is independent and takes no part in the transactions to be performed between the users and the proprietor of the secure database. It is further understood that both the secure database and the public database may be located on one or more servers operated by a third party.

According to a further embodiment of the first aspect, the user-operated device is a computer, smart phone or tablet running client software such as a web client, an app or terminal program.

The user-operated device may be any such device capable of communicating over the Internet or a similar network by means of a standard protocol such as Ethernet, WiFi, Bluetooth, 3G, 4G etc.

According to a further embodiment of the first aspect, the value corresponding to the total number of digital symbols in the indexed array of digital symbols is the same for all of the data sets within the batch.

In order for the game to be conducted using the same rules for all users, the number of scratchable fields of the online lottery ticket, i.e. the total number of digital symbols, may be the same.

According to a further embodiment of the first aspect, each of the indexed arrays of digital symbols being unique within the batch. Thereby each indexed array must not necessarily be unique between batches of the game, and thus the same indexed array may appear in the same game but a different batch.

Further, each of the lottery tickets of the batch may be unique in order for the game to be non-repetitive. At least the ID number of each of the lottery tickets within a batch should be unique.

According to a further embodiment of the first aspect, each of the digital symbols of the group of digital symbols are used at least twice in each of the indexed arrays of digital symbols, preferably three times, more preferably four times. Further, a "joker" or "wildcard" symbol may be used for representing any of the available digital symbols, and such "joker" or "wildcard" may only be used once.

This allows the lottery game to be more exciting since the user will be able to "collect" a certain digital symbol during the game and thereby increase the level of excitement of the game.

According to a further embodiment of the first aspect, the method in step d) further comprises transferring a user identifier from the secure database to the user-operated device. In this way, the user may be identified in the communication with the secure database. The user identifier may be e.g. an encrypted user name which ensures that the correct user is communicating with the secure database. The user identifier is sent between the user-operated device and the secure database at every instance when the two are communicating.

According to a further embodiment of the first aspect, the indexed array of digital symbols comprises between 4 and 64 digital symbols, preferably between 9 and 32 digital symbols, more preferably between 16 and 25 digital symbols.

Such number of digital symbols as described above will allow a sufficient time period of lottery entertainment for the user as well as allowing for a multitude of variations of the individual data sets.

According to a further embodiment of the first aspect, each of the data sets within the batch is associated with a virtual scratch-off lottery ticket. The above will be apparent from the below detailed description.

According to a further embodiment of the first aspect, the method in step f) further comprises determining at the secure database whether the digital symbols of the indexed array of digital symbols of the selected data set associated with the user-selected indexes match a set of predetermined winning digital symbols, the winning digital symbols, the indexed array of digital symbols and the predetermined number of times preferably being chosen such that the final determination cannot take place until the predetermined number of times has been reached.

The above determination of win or loss may be performed when the user has unveiled the predetermined number of digital symbols and at the same time the user may be presented with the complete data set as a verification of the result. Alternatively, for preventing any statistical analysis of remaining data sets in the batch by the user and/or ensuring an adequate profit for the organizer, the determination can be made after the complete batch has been finished.

According to a further embodiment of the first aspect, the predetermined number of times being chosen such that the total number of digital symbols transferred from the secure database to the user-operated device being less than 50% of the value corresponding to the total number of digital symbols in the indexed array of digital symbols of the selected data set, preferably 25%, more preferably the predetermined number is between 2 and 5.

Such number of digital symbols as described above will allow a sufficient time period of lottery entertainment for the user as well as allowing for a multitude of variations of the winning digital symbol combinations.

At least the above object or at least one of numerous further objects which will be evident from the below description of the present invention, is according to a second aspect of the present invention obtained by a system for conducting a verifiable transfer of data over a network, the system comprising a secure database, the secure database being connected to a public database and to one or more user-operated devices via the network, the secure database being capable of:

a1) generating a batch of data sets, each of the data sets comprising an identifier uniquely identifying the data set within the batch and an indexed array of digital symbols whereby each digital symbol is chosen from a group of digital symbols, a2) generating an encrypted version of the batch and a decryption key at the secure database, b) sending the encrypted version to the public database and receiving a receipt from the public database, c) selecting one of the data sets of the batch and removing the selected data set from the batch, the selecting of one of the data sets being made by the user-operated device or alternatively randomly by the secure database d) sending the identifier of the selected data set and a value corresponding to the total number of digital symbols in the indexed array of digital symbols of the selected data set to a user-operated device, e) receiving a user-selected index associated with the indexed array of digital symbols of the selected data set from the user-operated device and sending the digital symbol associated with the user-selected index of the indexed array of digital symbols of the selected data set to the user-operated device, f) repeating step e) a predetermined number of times, whereby the total number of digital symbols sent to the user-operated device being less than the value corresponding to the total number of digital symbols in the indexed array of digital symbols of the selected data set, g) repeating steps c)-f) until all data sets of the batch have been removed, and h) sending the decryption key from the secure database to the public database.

The above system according to the second aspect may be used for conducting the above method according to the first aspect and all of the embodiments applicable to the above method according to the first aspect will be equally applicable to the system according to the second aspect.

DETAILED DESCRIPTION OF THE DRAWINGS

Figure 1:
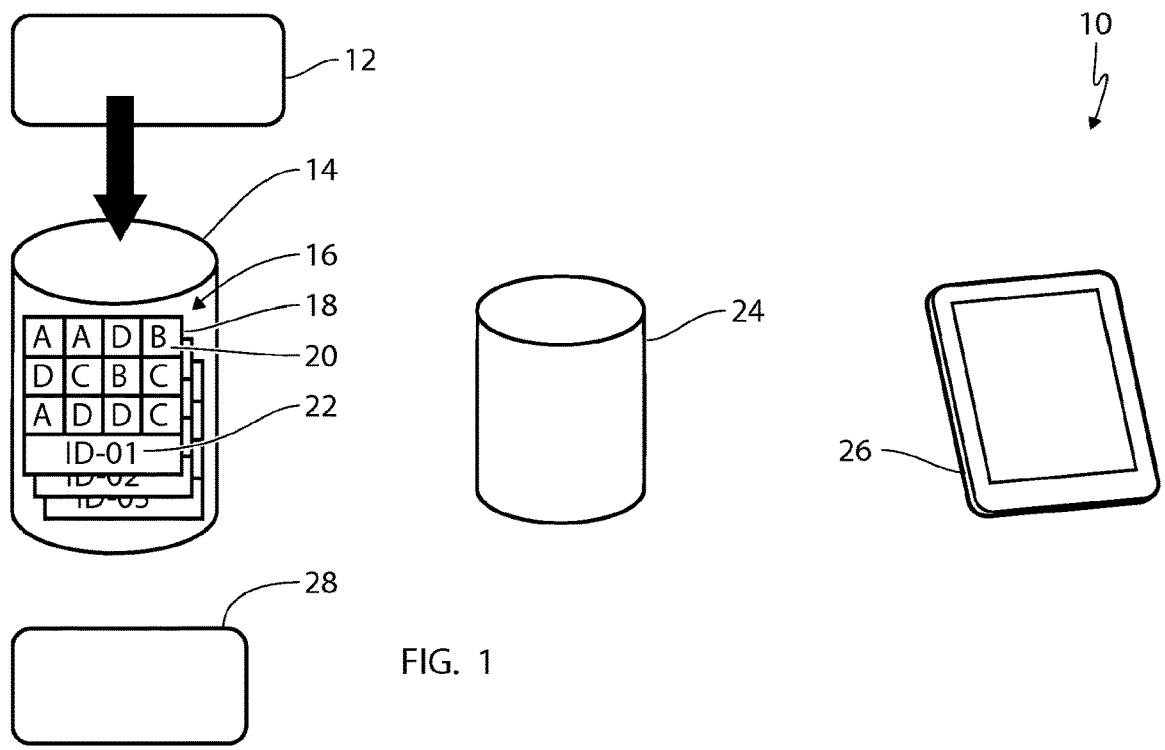
FIG. 1 illustrates a lottery system according to the present invention when the batch of data sets is generated.

FIG. 1 is a schematic view of an online lottery system 10 according to the present invention. The lottery system 10 comprises a main server 12 which is responsible for the rate of lottery ticket generation, the types of lottery tickets to be available for purchase, the prices of the lottery tickets and the available prizes.

The main server 12 communicates with a secure database 14 which is responsible for conducting the lottery. By request from the main server 12, the secure database 14 generates a batch 16 of data sets 18, wherein each data set 18 corresponds to a virtual lottery ticket. Each data set 18 comprises an indexed array of digital symbols 20 and an identifier 22. The indexed array of digital symbols 20 of each data set 18 within the batch 16 is unique, and each identifier 22 uniquely identifies a data set 18 within the batch 16. The digital symbols 20 of each indexed array of digital symbols 20 of each data set 18 are chosen randomly from a limited group of digital symbols. The digital symbols may e.g. represent a letter, a number, a pictogram or the like.

The lottery system 10 further includes a web server 24, through which the lottery system 10 may communicate via the Internet with a user-operated device 26 such as a computer, Smartphone, tablet etc. The secure database 14 is additionally capable of communicating with a public database 28 which is accessible also by the user-operated device 26.

Each game is initiated by the user, and the lottery system responds to any requests sent by the user.

Figure 2:
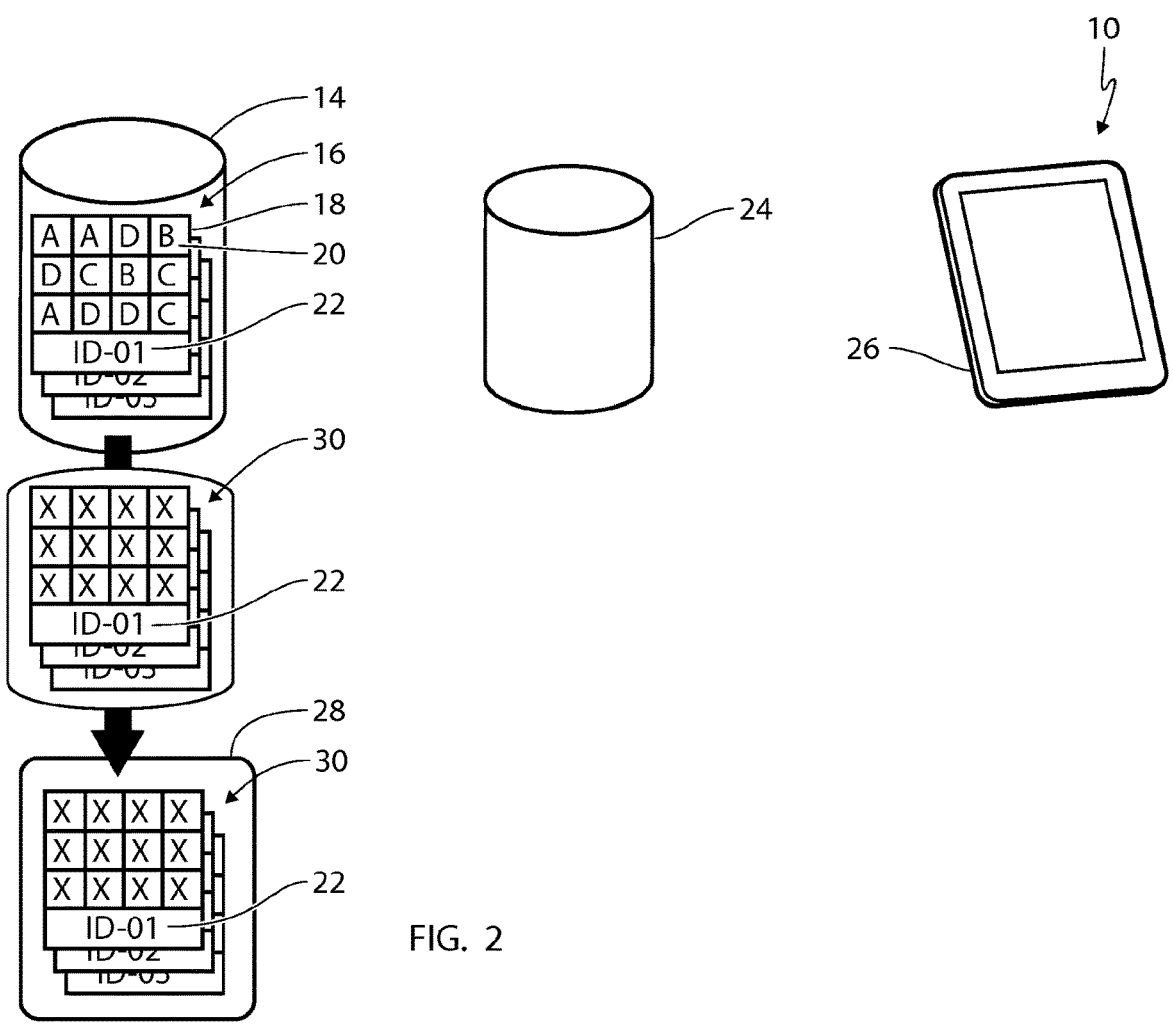
FIG. 2 illustrates a lottery system according to the present invention when an encrypted copy of the batch of data sets is transmitted to the public database.

FIG. 2 is a schematic view of an online lottery system 10 after a batch 16 of data sets 18 has been generated. At this stage, the secure database 14 is generating an encrypted copy 30 of the batch 16 of data sets 18. The encrypted copy 30 is sent to the public database 28, however, without sending any decryption information to the public database 28. Thus, the encrypted copy 30 is safe from any tampering by any of the public database 28, secure database 14 and user-operated device 26. When the public database 28 has acknowledged the receipt of the encrypted copy 30, the data sets 18 of the batch 16 are considered available for purchase by the users.

Figure 3:
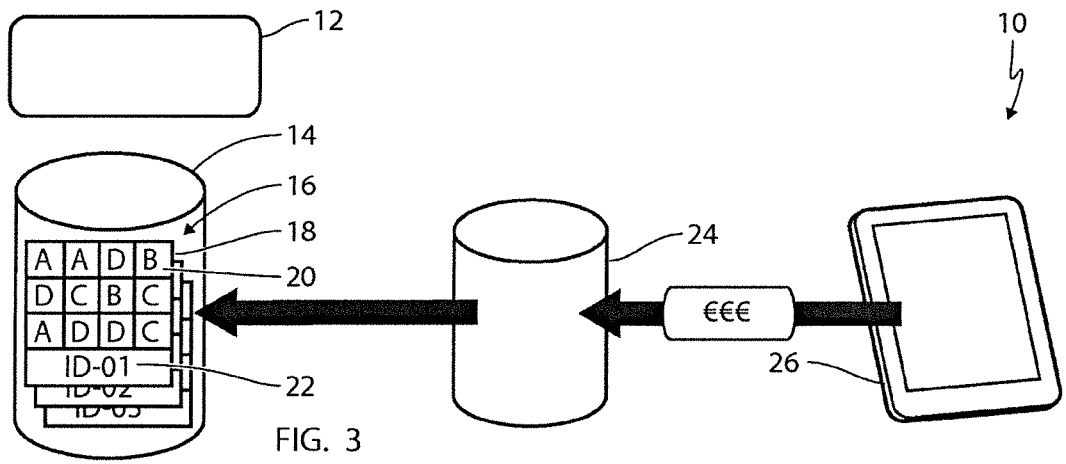
FIG. 3 illustrates a lottery system according to the present invention when the user-operated device is making a payment to the web database.

FIG. 3 is a schematic view of the user-operated device 26 making a payment to the web server 24. The user-operated device 26, which is controlled by a user wishing to participate in the lottery, accesses the web server 24 via the Internet and makes a payment corresponding to the stipulated price of a lottery ticket, e.g. by using a bank transfer, credit card, debit card etc. The payment information is sent to the main server 12. It is understood that a cash payment may not be necessary in all cases since the user may be allowed to participate in the game for free as a marketing or advertisement campaign or for any other reason not involving a cash payment.

Figure 4:
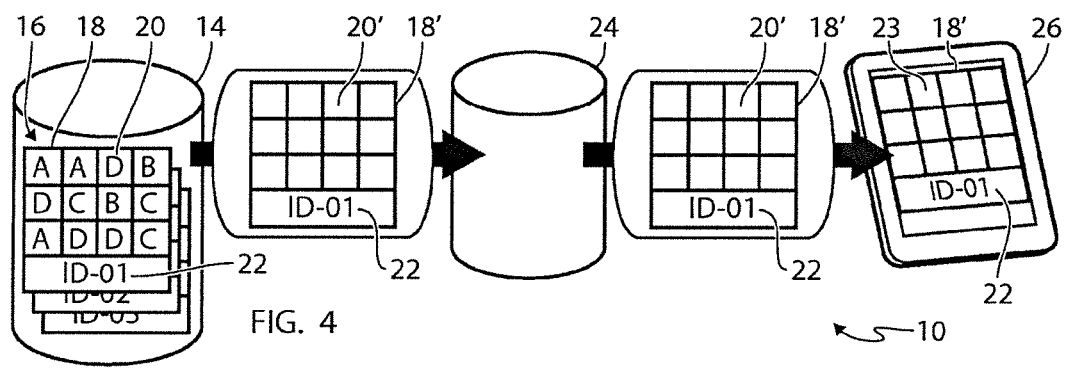
FIG. 4 illustrates a lottery system according to the present invention when the user-operated device is receiving a data set from the web database.

FIG. 4 is a schematic view of the user-operated device 26 receiving a data set 18' from the web server 24. Once the main server 12 has registered the payment, the secure database 14 will transmit a data set 18' from the batch 16 of data sets 18 to the user-operated device 26 via the web server 24. The data set 18' to be sent to the user-operated device 26 is either selected by the user at the user-operated device 26 by selecting an identifier 22, or randomly by the secure database 14. The data set 18' sent to the user-operated device is only containing the identifier 22 and a number corresponding to the total number of symbols contained in the indexed array of digital symbols 20. The user is thus faced with an identifier 22 and an indexed array of blank fields.

Figure 5:
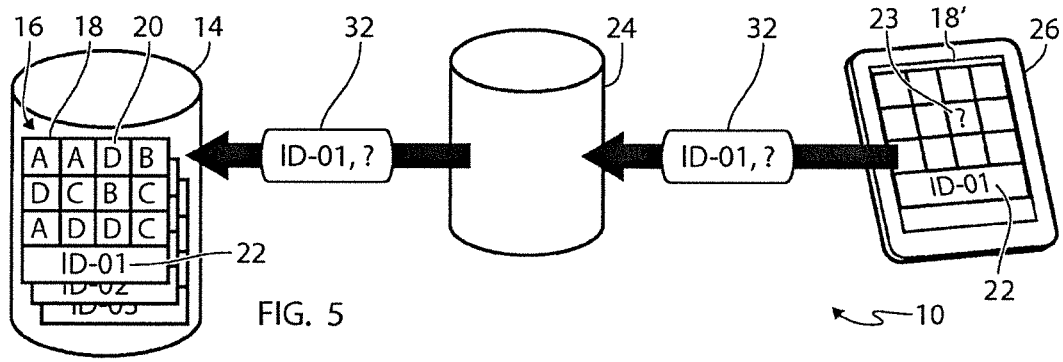
FIG. 5 illustrates a lottery system according to the present invention when the user-operated device is sending an index to the secure database.

FIG. 5 is a schematic view of the user-operated device 26 sending an index 32 to the secure database 14 via the web server 24. The index 32 is representing one of the blank fields in turn representing of the one of the symbols of the indexed array of symbols of the data set 18' from the web server 24.

Figure 6:
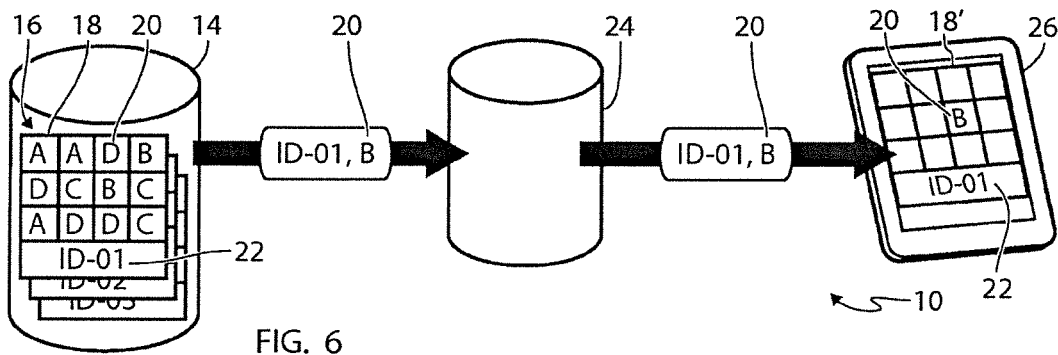
FIG. 6 illustrates a lottery system according to the present invention when the user-operated device is receiving a digital symbol from the secure database.

FIG. 6 is a schematic view of the user-operated device 26 receiving a digital symbol 20 from the secure database 14 via the web server 24. The digital symbol 20 sent from the secure database 14 to the user-operated device 26 is the digital symbol of the indexed array of symbols of the data set 18 corresponding to the index 32 selected by the user.

Figure 7:
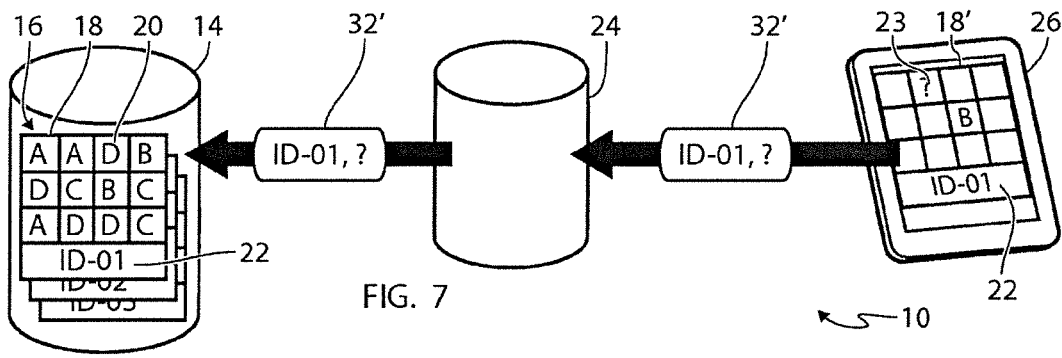
FIG. 7 illustrates a lottery system according to the present invention when the user-operated device is sending another index to the secure database.

FIG. 7 is a schematic view of the user-operated device 26 sending a further index 32' to the secure database 14 via the web server 24. The index 32' is representing another one of the blank fields in turn representing of another one of the symbols of the indexed array of symbols of the data set 18' from the web server 24.

Figure 8:
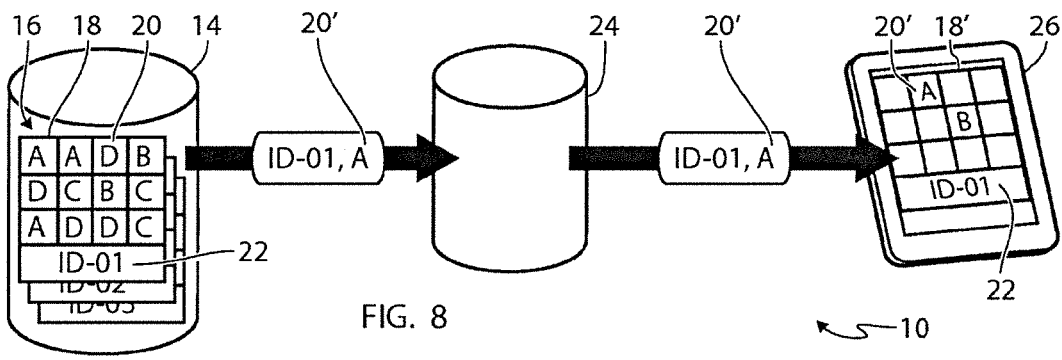
FIG. 8 illustrates a lottery system according to the present invention when the user-operated device is receiving another digital symbol from the secure database.

FIG. 8 is a schematic view of the user-operated device 26 receiving a digital symbol 20' from the secure database 14 via the web server 24. The digital symbol 20' sent from the secure database 14 to the user-operated device 26 is the digital symbol of the indexed array of symbols of the data set 18 corresponding to the index 32' selected by the user.

Figure 9:
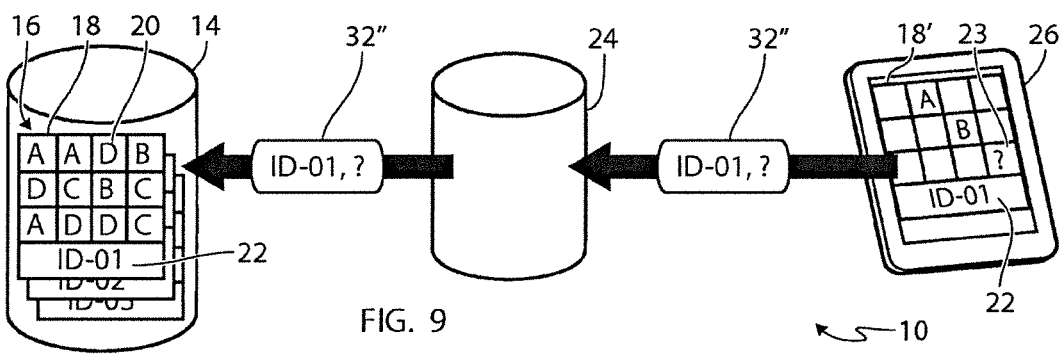
FIG. 9 illustrates a lottery system according to the present invention when the user-operated device is sending yet another index to the secure database.

FIG. 9 is a schematic view of the user-operated device 26 sending an index 32" to the secure database 14 via the web server 24. The index 32 is representing yet another one of the blank fields in turn representing of the yet another one of the symbols of the indexed array of symbols of the data set 18' from the web server 24.

Figure 10:
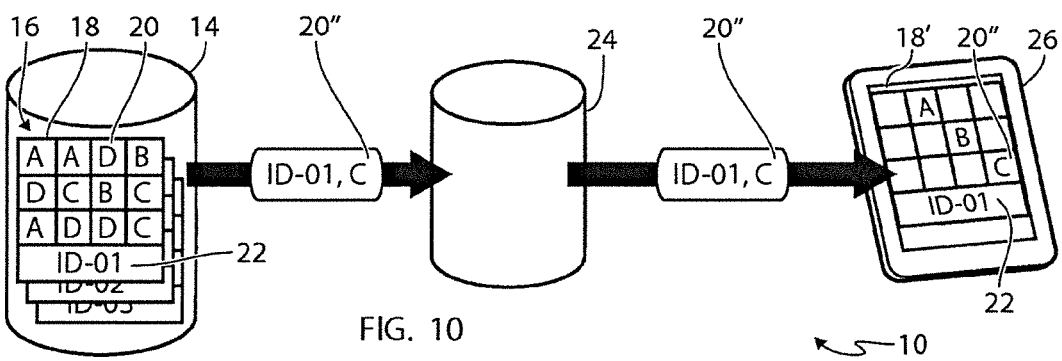
FIG. 10 illustrates a lottery system according to the present invention when the user-operated device is receiving yet another digital symbol from the secure database.

FIG. 10 is a schematic view of the user-operated device 26 receiving a digital symbol 20" from the secure database 14 via the web server 24. The digital symbol 20" sent from the secure database 14 to the user-operated device 26 is the digital symbol of the indexed array of symbols of the data set 18 corresponding to the index 32" selected by the user.

Figure 11:
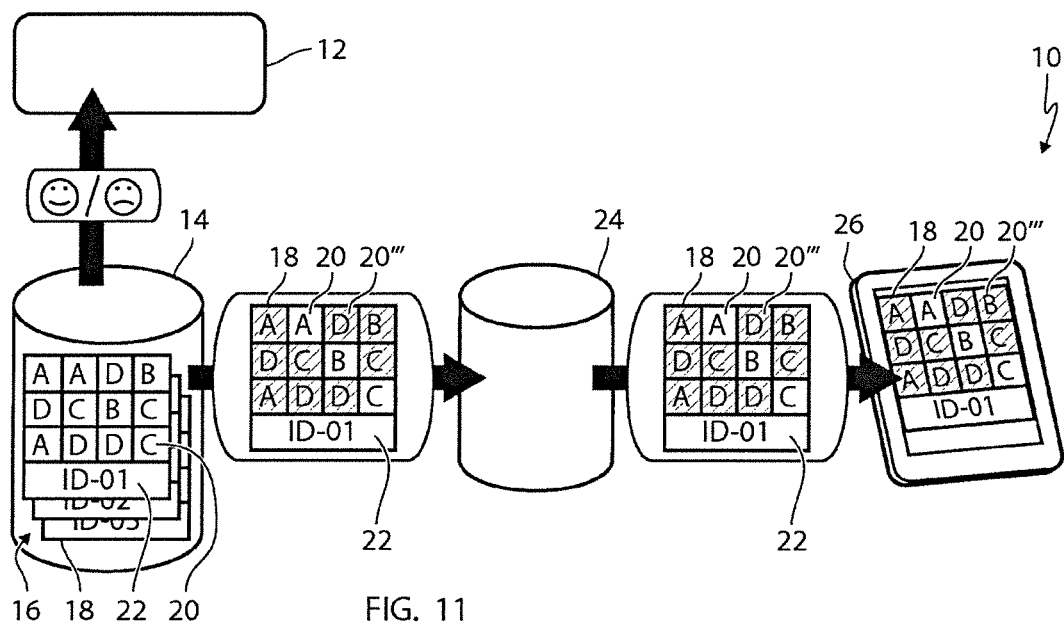
FIG. 11 illustrates a lottery system according to the present invention when the secure database determines whether or not the user is entitled to receive a prize.

FIG. 11 is a schematic view in which the secure database 14 determines whether or not the user is entitled to receive a prize. The secure database compares the symbols selected by the user to a pre-determined prize table, and notifies the main server 12 of the winning or losing status of the dataset used. Optionally, the complete dataset 18 may be transmitted to the user-operated device via the web server 24 for allowing the user to make a direct comparison. Thereby, also the non-selected symbols 20''' are revealed to the user.

Figure 12:
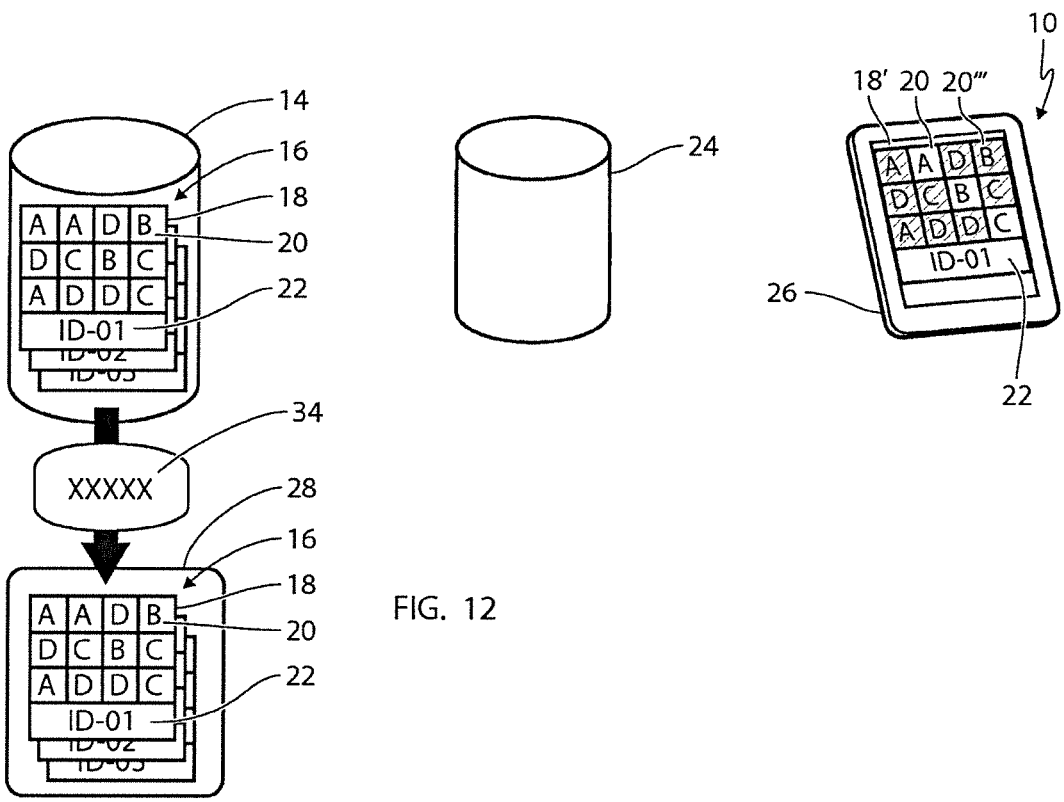
FIG. 12 illustrates a lottery system according to the present invention when the encryption key is sent from the secure database to the public database.

FIG. 12 is a schematic view of the final step of the lottery in which the complete batch 16 of the data sets 18 has been used, or after a predetermined time period has elapsed. A decryption key 34 is sent from the secure database 14 to the public database 28 such that the original batch may be re-established at the public database 28. The user or a lottery inspector may subsequently access the public database 28 to verify the correctness of the lottery by comparing the data set 18, including both the user-selected symbols 20 20' 20" and the non-user selected symbols 20''', with the data set 18 and symbols 20 20' 20" presented to the user by the secure database 14.

Although the above system and method have been described in relation to a specific embodiment relating to an online lottery, i.e. a scratch card lottery, it may be envisaged by the skilled person that numerous modifications of the above system and method may be made and that is may be equally applicable to other, non-lottery related purposes, such as an online shop, where the data set may represent a kind of goods and the symbols may represent an amount of goods which the user is purchasing and where the user at a later time may verify the original availability of a certain type of goods at the seller. It may alternatively be used in an online banking system where the data set may represent a user account and the symbols may represent different monetary amounts available at the user account, and where the user at a later time wishes to verify the original account statement at the bank.

REFERENCE NUMERALS USED

10. Lottery system
12. Main server
14. Secure database
16. Batch of data sets
18. Data set
20. Digital symbol
22. Identifier.
24. Web server
26. User-operated device
28. Public database
30. Encrypted copy
32. Index
34. Encryption key

The invention claimed is:

1. A method of conducting a verifiable transfer of data over a network, said method comprising the steps of:
   a1) providing (i) a main server in communication with a secure database, and (ii) a public database accessed by a web server in communication with said secure database and one or more user-operated devices through said network;
   a2) generating a batch of data sets by said main server in said secure database, each of said data sets comprising an identifier uniquely identifying said data set within said batch of data sets, and an indexed array of digital symbols, whereby each digital symbol is chosen from a group of digital symbols;
   a3) generating, by said main server, an encrypted copy of said batch of data sets and a decryption key in said secure database;
   b) transferring, by said network, said encrypted copy from said secure database to said public database; generating a receipt of said encrypted copy by said public database; and transferring, by said network, said receipt from said public database to said secure database;
   c) selecting, by one of a user-operated device and said main server, one of said data sets of said batch of data sets, and removing, by said main server, said selected data set from said batch of data sets;
   d) transferring, by said web server, the identifier of said selected data set and a value corresponding to a total number of digital symbols in said indexed array of digital symbols of said selected data set from said secure database to said user-operated device;
   e) transferring, by said web server, an index associated with said indexed array of digital symbols of said selected data set from said user-operated device to said secure database, and transferring, by said web server, the digital symbol associated with said index associated with said indexed array of digital symbols of said selected data set from said secure database to said user-operated device;
   f) repeating step e) a predetermined number of times, whereby a total number of digital symbols transferred from said secure database to said user-operated device is less than said value corresponding to the total number of digital symbols in said indexed array of digital symbols of said selected data set;
   g) repeating steps c)-f) until all data sets of said batch of data sets have been removed; and
   h) transferring, by said network, said decryption key from said secure database to said public database so as to re-establish said batch of data sets in said public database using said decryption key, thereby allowing said user-operated device to access, through said web server, said selected data set from said public database by using said identifier.

2. The method according to claim 1, wherein said network is the Internet.

3. The method according to claim 1, wherein said method in step e), further comprises transferring, by said web server, said identifier and said user-selected index associated with said indexed array of digital symbols of said selected data set from said user-operated device to said public database.

4. The method according to claim 1, wherein said public database is independent from said secure database and physically separated from any of said user-operated devices.

5. The method according to claim 1, wherein each of said one or more of said user-operated devices is selected from the group consisting of a computer, a smart phone, and a tablet.

6. The method according to claim 1, wherein said value corresponding to the total number of digital symbols in the indexed array of digital symbols is the same for all of said data sets within said batch of data sets.

7. The method according to claim 1, wherein said indexed array of digital symbols is unique within said batch of data sets.

8. The method according to claim 1, wherein each of said indexed arrays of digital symbols includes at least two of each of said group of digital symbols.

9. The method according to claim 1, wherein said method in step d) further comprises transferring, by said web server, a user identifier from said secure database to said user-operated device.

10. The method according to claim 1, wherein said indexed array of digital symbols comprises between 4 and 64 digital symbols.

11. The method according to claim 1, wherein each of said data sets within said batch of data sets is associated with a virtual scratch-off lottery ticket.

12. The method according to claim 11, wherein said method in step f) further comprises determining, by said main server, at said secure database, whether the digital symbols of said indexed array of digital symbols of said selected data set associated with said user-selected indexes match a set of predetermined winning digital symbols.

13. The method according to claim 1, wherein said predetermined number of times is chosen such that the total number of digital symbols transferred from said secure database to said user-operated device is less than 50% of said value corresponding to the total number of digital symbols in said indexed array of digital symbols of said selected data set.

14. The method according to claim 1, wherein in step g) all of the remaining data sets of said batch of data sets after removal of the selected data set are automatically removed after a predetermined period of time.

* * * * *